United States Patent [19]

Papadakis

[11] 4,430,692
[45] Feb. 7, 1984

[54] AUTOMOTIVE VEHICLE WHEEL ILLUMINATION AND LIGHT REFLECTIVE SYSTEM

[76] Inventor: Alexandros M. Papadakis, 250 Beverly Blvd., Upper Darby, Pa. 19082

[21] Appl. No.: 287,236

[22] Filed: Jul. 27, 1981

[51] Int. Cl.³ .............................................. F21V 7/04
[52] U.S. Cl. ..................................... 362/32; 362/78; 362/80; 362/240; 362/249; 362/365
[58] Field of Search ...................... 362/32, 61, 78, 80, 362/240, 249, 365

[56] References Cited

U.S. PATENT DOCUMENTS

| | | | |
|---|---|---|---|
| 2,526,548 | 10/1950 | Franklin | 362/78 |
| 2,561,756 | 7/1951 | Shook | 362/32 X |
| 3,654,452 | 4/1972 | Frey et al. | 362/32 X |
| 3,761,706 | 9/1973 | Frey | 362/32 X |
| 4,135,229 | 1/1979 | Modurkay | 362/78 X |

FOREIGN PATENT DOCUMENTS 2066444  7/1981  United Kingdom ................. 362/32

*Primary Examiner*—Peter A. Nelson
*Attorney, Agent, or Firm*—Eugene E. Renz, Jr.

[57] ABSTRACT

An automotive vehicle having at least one rotatable wheel, the wheel having light reflective surface means thereon, a light source mounted to the vehicle, first fixed light transmission means operatively associated with the light source adapted to receive light from the source and transmit the light to a position proximate to, but spaced from, a rotatable mount wheel, second light transmission means operatively mounted to and rotatable with the wheel mount, the first and second light transmission means respectively having light emitting and receiving terminal end means, the light emitting and receiving end means on the respective first and second light transmission means consisting of discrete separate sets, disposed in spaced relationship from one another, and adapted to transmit light therebetween as the wheel rotates with respect to the vehicle, second light ray emitting terminal end means on the second light transmission means, remote from the first terminal end means thereon, and operable upon rotation of the wheel with respect to the vehicle to direct emitted light rays onto the reflective surface means on the wheel and thereby produce a resultant aesthetically pleasing visual light illumination effect from the reflective surface means on the wheel, the light transmission means including fiber optic light guides portions.

10 Claims, 9 Drawing Figures

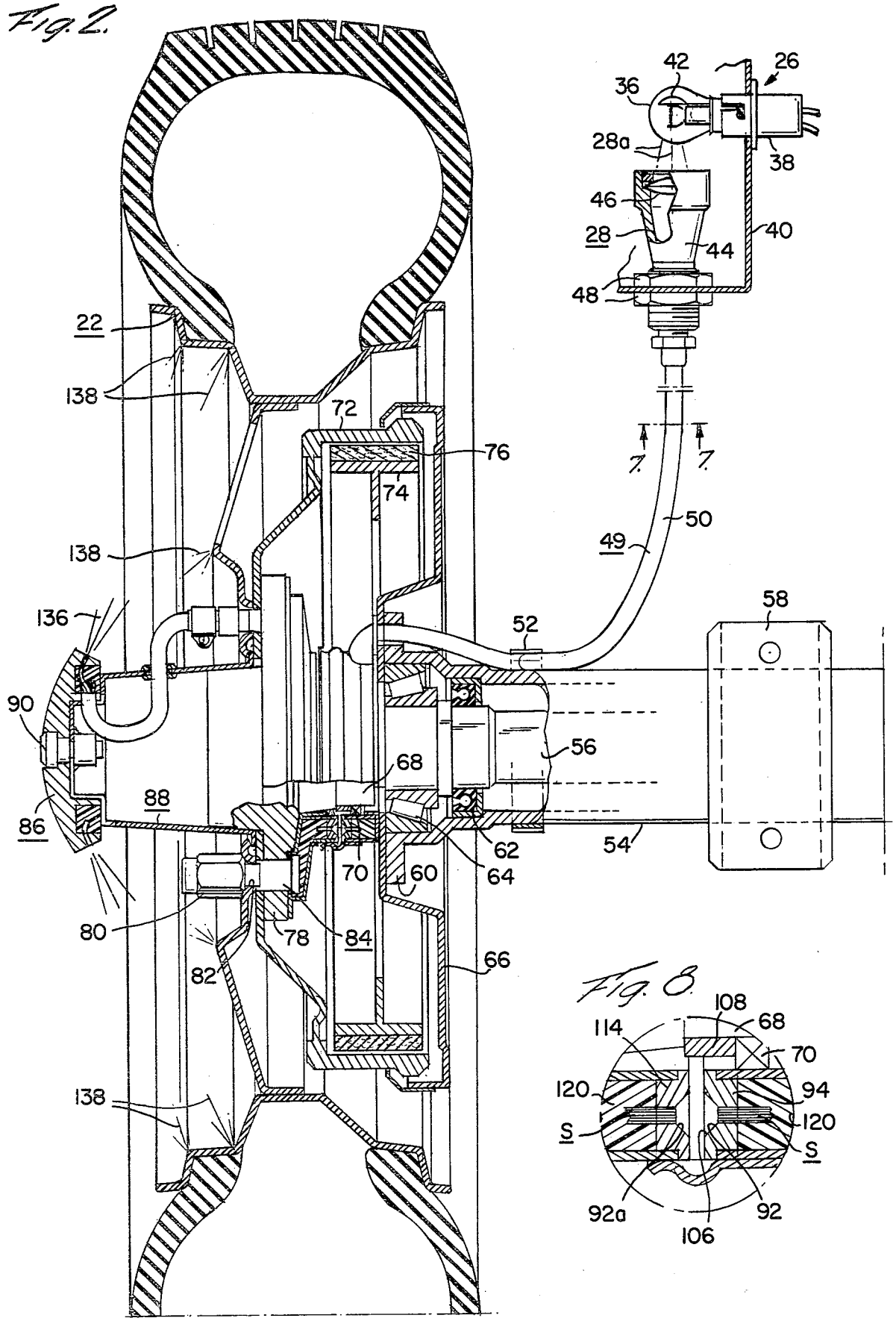

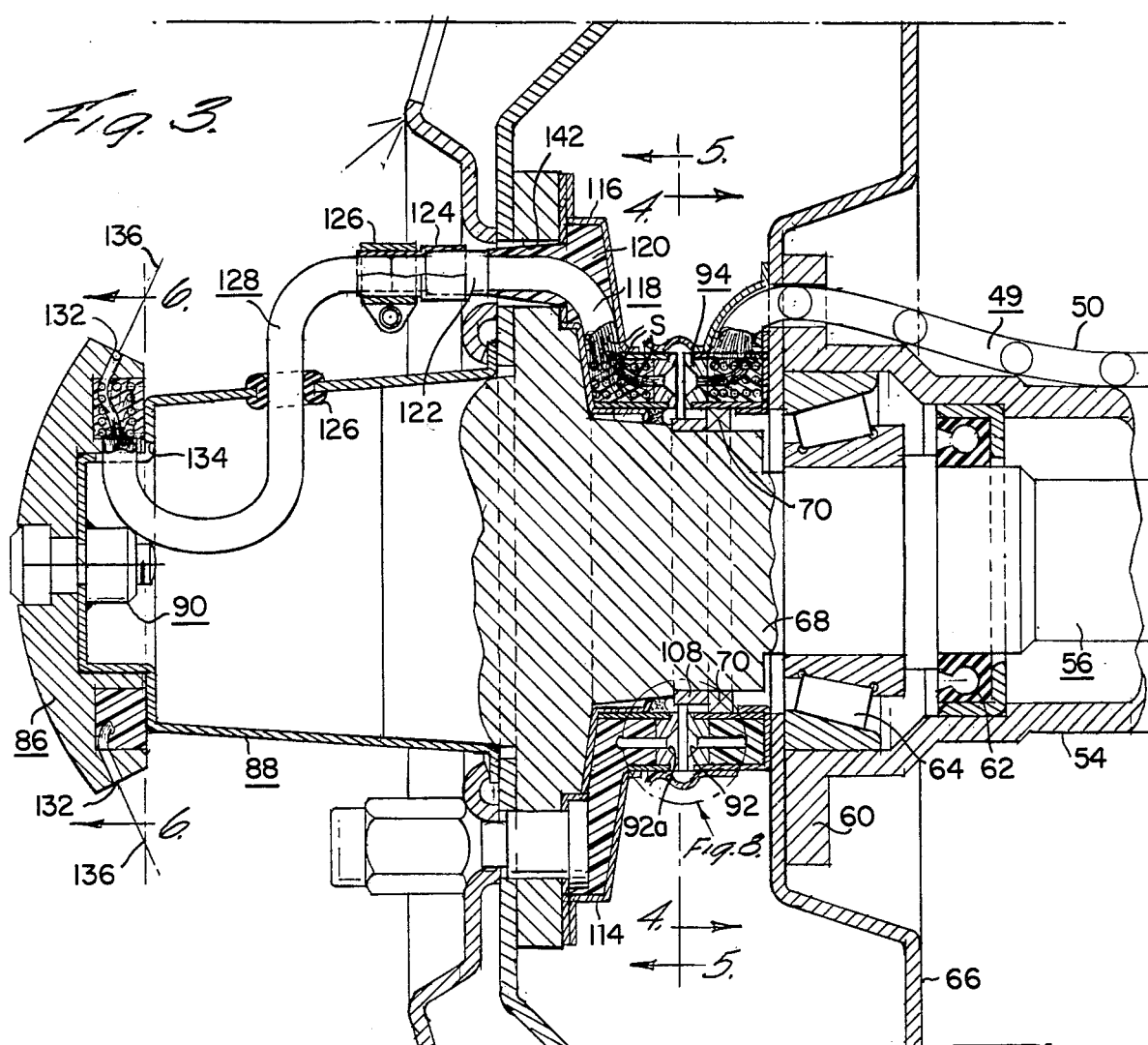
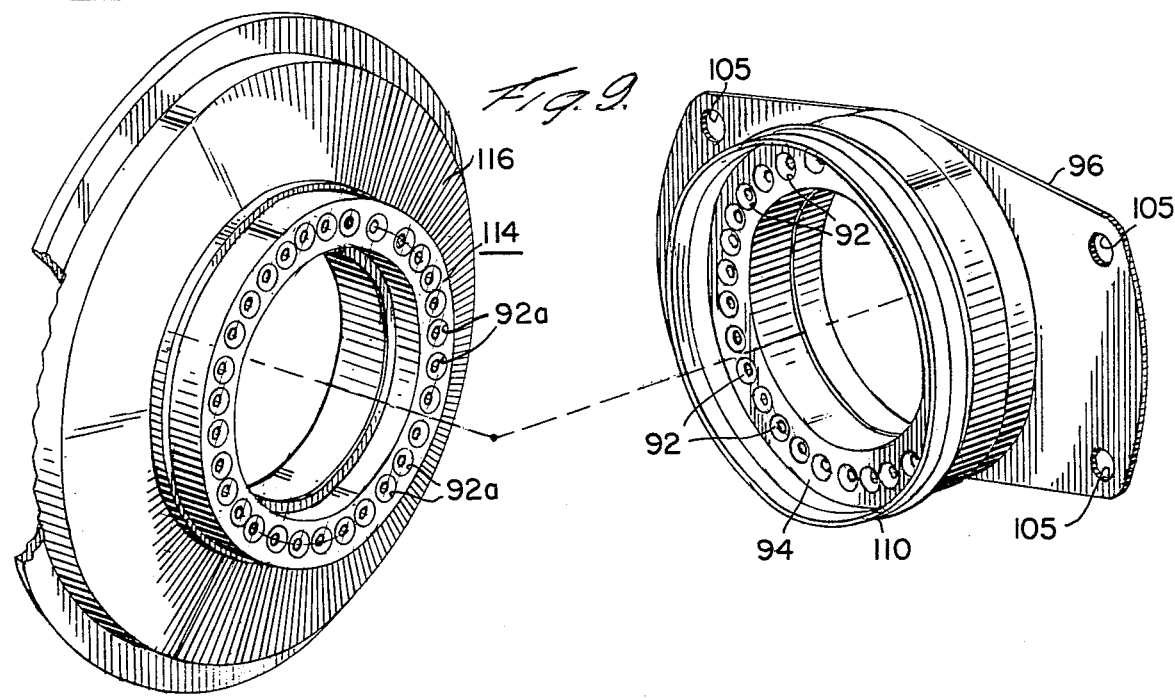

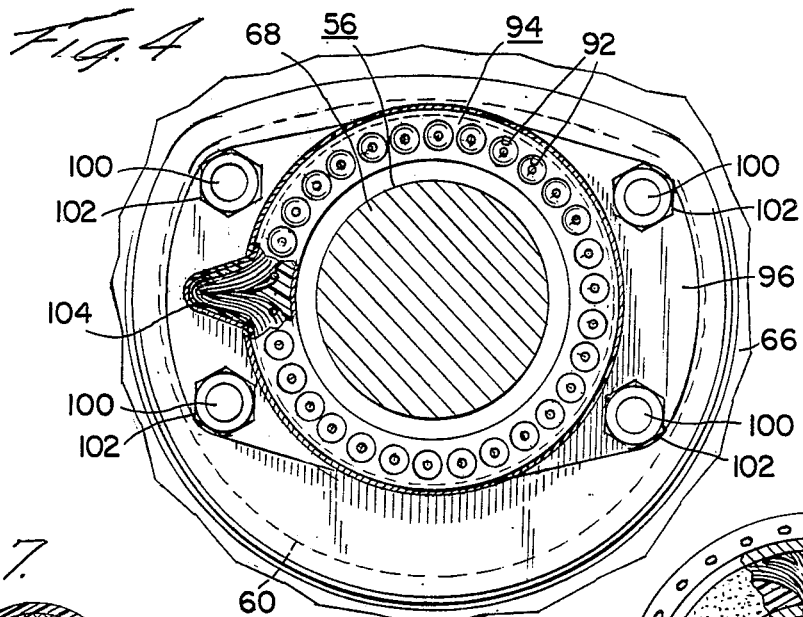
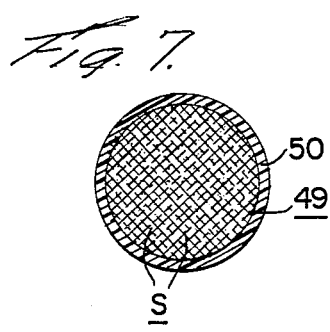
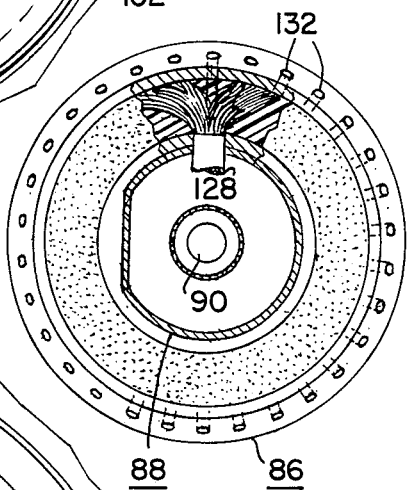
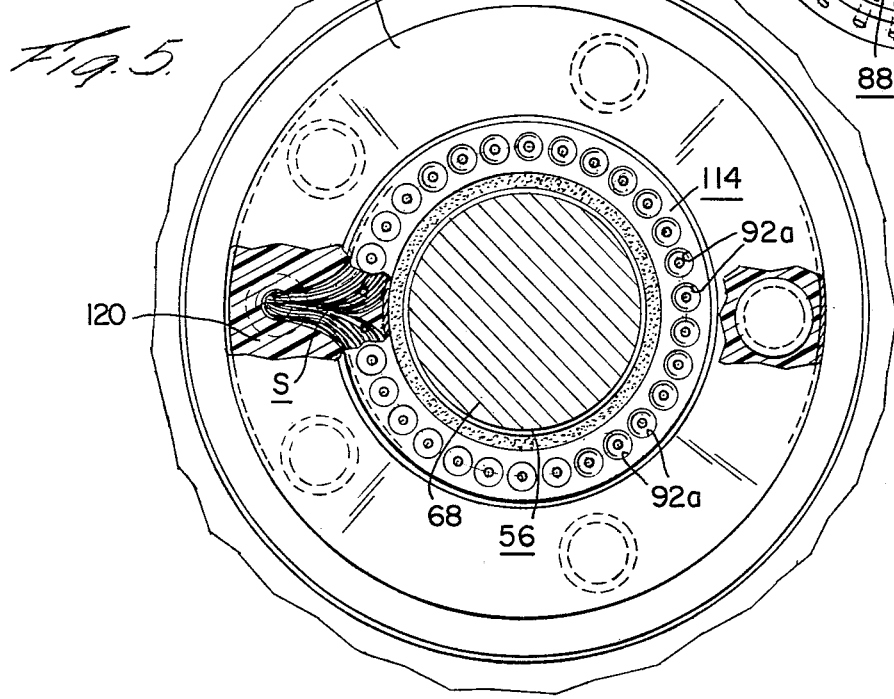

4,430,692

AUTOMOTIVE VEHICLE WHEEL ILLUMINATION AND LIGHT REFLECTIVE SYSTEM

TECHNICAL FIELD

The invention relates generally to illumination and light reflective systems for automotive vehicle wheels and particularly where the automotive wheels are the usual supportive type as used in present day automobile wheels. It is increasingly popular for these wheels to be constructed of high light reflective material or otherwise to contain either a coating or other high light reflecting means or areas thereon. Such wheels include known custom type chrome wheels and the like. These chrome wheels can consist in different types and constructions which can be all chrome, or have chrome plated spokes, or can be of the wire wheel type, but the external surfaces, outward from the car, being of highly light reflective nature.

The wheels referred to above produce a very pleasing or aesthetic illumination when light is impinged thereon, or when the vehicle with such wheels passes through an area or region having high intensity illumination.

Many efforts have been made in the past to have more effective illumination of such wheels, although mechanical problems have been encountered in that the wheels are rotatable with respect to the vehicle on which mounted, and sources for light illumination of the wheels or surfaces thereon create difficulties.

The present invention is designed primarily to overcome existing difficulties and to give the desired end result in a highly satisfactory and efficient manner.

BACKGROUND OF THE INVENTION

As mentioned in the foregoing "TECHNICAL FIELD" recitation, the underlying desires of many automobile owners has been set forth and, additionally, it has broadly been pointed out that numerous problems exist, and this has substantially reduced attempts for the enhanced illumination of the wheels, even though such wheels, due to their inherent illumination characteristics and other fanciful and aesthetic designs, are in substantial use.

As is well known, the types of wheels contemplated by the invention are quite expensive and continuing efforts, accordingly, have been made to enhance the appearance and desired results obtainable due to the wheel appearances, and the highly reflective materials being used. While it has been mentioned that chrome constitutes one of currently used materials to obtain the illumination and/or reflective results, it is obvious that other materials currently known can be used, including plastic materials incorporating reflective particles and/or coatings.

One of the main difficulties heretofore encountered in attempts to obtain the enhanced effect results from difficulties of illumination of the wheels. Attempts have heretofore been made to incorporate illuminating means in the wheel structures or mounting means therefor. Such attempts have not been satisfactory due to effects resulting from rotation of the wheels along poor roads, and another difficulty arises in the lack of available space for affixation of such means.

Other attempts to obtain the desired result have utilized light sources or light implementing means mounted on vehicles, per se, and utilization of some types of mechanical or other means to transmit light from the fixed source on the vehicle to the wheels. Sliding contacts, for example, have been attempted but the overall and/or lasting results have been highly questionable.

Principally, the present invention is directed accordingly to very substantial improvements in apparatus and structure for light illumination and reflections from automotive vehicle wheels which incorporate thereon, or as a part thereof, high light reflecting surfaces and/or reflective means attached to the wheel. The system taught by the present invention overcomes difficulties heretofore encountered due to space limitations, mechanical vibrations of the wheels and/or transmission between fixed light sources on the vehicle and revolving wheel structures. The present invention is highly effective and overcomes many of the known existing drawbacks.

The present invention will be explained hereinafter as applied to an automotive vehicle, i.e. an automobile, having usual rotatable support wheels thereof with custom wheels of decorative appearance and preferably with high light reflective surfaces or means thereon, such as chrome plated wheels. Many known types of such wheels are currently in use and the present invention is applicable to different types. It also will be readily apparent that the principles and operational features and characteristics of the invention are more broadly applicable than in this particular application.

Accordingly, while the present invention is specifically described in a single preferred form and application, the invention, obviously, is not limited to the shown and described structures. Variations in use, and specifics of constructional details and materials, will be obvious and within the scope of the invention.

It is here pointed out that the essence of the invention resides in the use of fiber optics techniques for light transmission purposes. A source of light can be fixed to an object such as an automotive or automobile vehicle, and operatively transmitted to a rotating wheel in a highly effective manner. Fiber optics are, in themselves, well known, and it is obvious that constructional arrangements utilizing fiber optics permits of spacing of segments thereof while still obtaining effective transmission of light thereby. It is these features and other obtainable useful end results, which permit the present invention.

SUMMARY OF THE INVENTION

The present invention is broadly directed to a system for illumination and reflection of light from highly reflective surfaces on automobile wheels, in the nature of chrome wheels, which normally are of custom construction.

In accomplishing the results obtained, the principles of fiber optics are used to transmit light from a fixed light source on an automobile for example, such as a side light panel or other fixed light source activating means, to a rotating support wheel, and then direct the light as transmitted in the form of incident rays against and impinging the same on the highly reflective surfaces of the wheel.

The use of fiber optics, in the manner taught by the present invention, permits a fixed position segment or portion on the vehicle, having a terminal end thereon through which light from a source is directed to a spaced terminal end, and a fiber optics system on a rotatable wheel, for transmission from the terminal end point of reception to a second spaced terminal end of the optics system on the wheel and incorporating means for directing the light transmitted to impinge on wheel surfaces with a very aesthetically pleasing illumination and light reflection from the reflective surfaces.

The present invention also incorporates seal means to overcome environmental difficulties such as moisture, dirt and the like, during movement of the automobile in normal road use.

Other objects and advantages of the present invention will become readily apparent from the following detailed description, wherein there is shown and described a preferred embodiment of the invention, simply by way of illustration of a currently preferred and contemplated mode for carrying out the invention. As will be realized, the invention is capable of other specific embodiments and usages, and its several details are capable of modification in various, obvious respects, all without departing from the invention. Accordingly, the drawings and description are to be regarded merely as illustrative in nature, and not as restrictive.

BRIEF DESCRIPTION OF THE DRAWINGS

The accompanying drawings illustrate a preferred embodiment of the invention and, when taken together with the accompanying description, serve to explain the principles and structure of the invention.

In the drawings:

FIG. 2 is a sectional view taken along line 2—2 of FIG. 1 looking downward upon a lower section of the wheel and additionally disclosing details of the light transmission system from a fixed light means on the vehicle to light impingement or ray directing means on the wheel;

FIG. 3 is a fragmentary, sectional, enlarged view of a portion of the light transmission means shown broadly in FIG. 2, but disclosing in greater detail the mounting and positionment of the fiber optics transmission means from a fixed vehicle to a rotating wheel and details of the mountings and seals being shown therein;

FIG. 4 is a fragmentary, enlarged, sectional view taken along line 4—4 of FIG. 3 and disclosing details of light transmission end terminal means, operationally mounted and affixed to a vehicle and adapted to transmit light from a light source of the vehicle to light transmission means on a rotating wheel;

FIG. 5 is a fragmentary, enlarged, sectional view taken along line 5—5 of FIG. 3 looking, in the direction of the wheel, and disclosing in greater detail light receiving terminal end means of the fiber optics system for the rotating wheel, coacting with means of FIG. 4;

FIG. 6 is a sectional view taken on line 6—6 of FIG. 3 and disclosing in greater detail the operational mounting of the fiber optics system in a cap mounted to the wheel, and the emanation of light rays therefrom toward reflective surfaces on the outer wheel portions;

FIG. 7 is an enlarged, sectional view of a fiber optics transmission bundle, or line, utilized in the invention, taken along line 7—7 of FIG. 2;

FIG. 8 is an enlarged, sectional view of the area indicated by the broken line circle in FIG. 3, designated as "FIG. 8", and disclosing improved light transmission means utilized by the present invention, disclosing the relationship between spaced terminal light transmitting ends of fixed and rotating fiber optics bundles, with sealing means therearound and disposed at the inner faces of fixed and rotating rings in the structure; and FIG. 9 is a fragmentary, enlarged, partially in section, view of fixed and movable rings, respectively incorporating therein fixed terminal ends of the optic portions fixed to the vehicle and to means for the rotatable wheel.

DETAILED DESCRIPTION OF PREFERRED EMBODIMENTS

Figure 1:
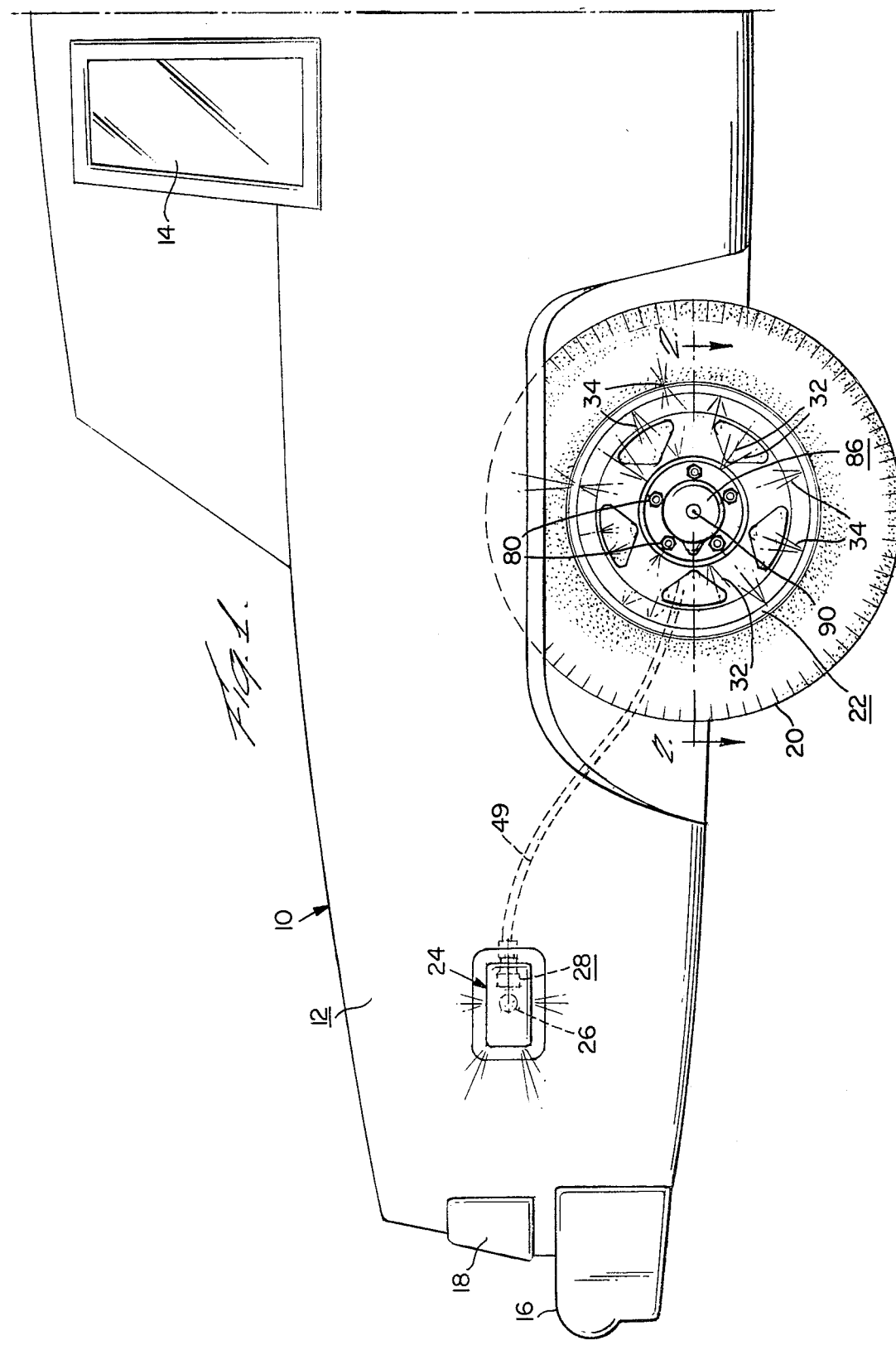
FIG. 1 is a side elevational view of a rear portion of a modern conventional automobile illustrating the general concept of the invention for aesthetically and artistically illuminating a wheel having highly reflective surfaces such as chrome thereon, and utilizing flexible fiber optics light guide means to transmit light from a fixed position on the vehicle to a rotating wheel.

Referring now in detail to the drawings, the invention, and the principles thereof, are shown in a preferred embodiment as applied to an automobile having custom chrome wheels thereon and utilizing fiber optics principles and features to transmit light from a fixed source on the automobile, namely, a side panel light on a rear fender of the automobile, and transmission thereof to emission means on the wheel mounted to direct and impinge incident rays of light onto the highly light reflective chrome surfaces of the wheel.

The drawings and following description refer to and discuss only a single workable disclosure of the basics of the invention as applied to a modern, conventional type car.

For a general understanding of the principles and application of the invention, reference is here made to FIG. 1. In this figure there is shown the rear portion of a standard, or conventional, present day automobile, generally designated 10, including the usual rear fender 12, rear side window 14, rear bumper 16 and a rear light 18, all in the usual manner. Also, in a usual manner, the automobile is moveably mounted by means of tires 20 operatively attached to a wheel 22, which as shown is a right rear wheel. The wheel as shown at 22 is a five spoke chrome plated wheel. This particular wheel, shown for illustrative purposes only, is an "Aztec" wheel sold by outlets of an "Alan Group, Inc.", consumer automotive company of Wilmington, California. Obviously, different types of wheels including different constructions, configurations and having different reflective areas or materials could be utilized. The desired effect can be obtained with the accompanying aesthetic wheel illumination and reflection when using many known different types of wheels.

For illustrative purposes to illustrate a possible light source as contemplated for use in the invention, there is shown in FIG. 1 a panel light, generally designated 24, in the rear fender 12 of the vehicle. While it is preferable to have or use a light source as close as possible to the wheel adapted to receive application of the inventive principles, and in this instance, utilizing the closest adjacent panel light to each wheel, it is to be understood that independent light sources could be attached to the vehicle and in some instances might be preferred in order to obtain higher levels of light emission. If, for example, high intensity light is desired, it is possible to use a separate higher intensity bulb and light source. Preferably, however, the closer it is possible to position the illumination source to the wheel, the better are the results obtained and in a simpler manner and construction. As pointed out above, the present invention contemplates the utilization of fiber optics principles for light transmission. It is to be noted that under known circumstances, the efficiency of light transmission in fiber optics can decrease with varying degrees of severity with the transmitted distance. The light transmission efficiency decreases rather rapidly with distance, as is well known to those skilled in the art.

In any event, and as shown in FIG. 1, the light source 26 of light panel 24, which normally emits light rays schematically shown at 28a, is used in practicing the invention. A lens system, generally designated 28, is operatively positioned proximate light source 26 and is operationally interconnected to a first fixed light transmission means 49 which is constituted by a flexible fiber optics light guide as will be more specifically shown and described hereinafter. This first fixed light transmission means is preferably fixedly attached or mounted to the vehicle, as shown in greater detail in FIG. 2 of the drawings. Attention is invited, however, to the schematic representation of emitted light rays (FIG. 1) 32 and schematically shown reflected light rays 34 as obtained when using the present invention. The light source 26, as shown in FIG. 2, includes a light bulb 36 mounted in socket 38 in a usual manner, the socket being mounted to the rear panel light housing or panel box 40 in any known manner. The bulb 36 as shown includes a reflector 42 which can serve to increase efficiency although other bulb types can, of course, be used.

The lens system 28 preferably incorporates in the casing 44 thereof a condensing lens system 46. The housing 44, as shown, is mounted to panel housing 40 by coactive nuts 48. The lens system is operationally attached the first fixed light transmission means, or fiber optics system, including a preferably plastic jacketed flexible fiber optics light guide 50. The light guide jacket is affixed by means of a retention or retaining band 52 to the axle housing shaft 54, within which axle shaft 56 is operationally mounted. The rear end, as shown in the drawings, is of a type used with many vehicles, details of which are shown, for example, in the publication "Petersen's Basic Auto Repair Manual", 8th Edition, at pages 257 and 261. The present system will be described with reference to this specific mechanical apparatus but, obviously, can be modified to be utilized with other types. This construction also incorporates spring holders or mounting blocks 58. Axle housing 54 terminates in a flange 60. A seal 62 and bearing 64 are utilized as is normal. A drum backing plate 66 is attached in a usual manner. Axle 56 includes an integrated hub 68 and an axle seal 70, operatively disposed. The structure additionally includes a brake drum 72, brake shoe 74 and brake lining 76.

The chrome wheel 22, having angularizations in a usual manner for strength, is mounted on axle flange 78, integral with axle shaft 56 by means of lug nuts 80, which pass through openings 82 in the wheel and nut flange attachment means at 84 in a known manner. As shown in the drawings, the lug nuts are of a chrome acorn type or configuration. The chrome wheel shown in the present device has five lug bolt openings 82 therethrough as can be seen by reference to FIG. 1. An additional opening is used in connection with the optics system as will be hereinafter explained. A chrome cap 86 is attached to a chrome hub cover spacer 88 by means of nut, bolt assembly 90.

The first flexible fiber optics light guide 49, referring to FIGS. 3 and 7, includes within the plastic jacket 50 a plurality of individual fibers of a known type used in fiber optics. In the shown and described embodiment, each bundle consists of approximately 1,470 fibers which can be formed by separation or segregation, into a plurality of separate bundles in a number comprising thirty strand bundles of 49 each. An overall construction of this glass fiber optics light guides type can be found in the publication "Fiber Optics" which is a DuPont Croton light guide (G). It is known that this type of light guide, although others can be used, will transmit light over the required distance of the present invention and the individual strands can be segregated, or grouped, into the plural bundles, as above set forth. The plural bundles have their ends terminating in corresponding openings 92 in mounting ring 94 affixed to plate 96 which is, in turn, mounted on axle retaining bolts 100 by nuts 102. The entry of the 1,470 fiber optics strands segregated into the thirty bundles of 49 strands is generally indicated at 104 in FIG. 4 with the individual bundles being individually directed to and terminating in one of the high reflective coated apertures or openings 92 in the mounting ring 94, which in turn is attached to plate 96 and this plate is mounted to the axle housing flange 60 and drum backing plate by means of bolts 100 and nuts 102, the bolts passing through openings 105.

Attention is invited to the fact that the above referred-to fiber optics light guides has a construction wherein each of the bundles will transmit light therefrom and when utilized in conjunction with the reflective surfaces 106, will direct light passing through each of the strands and, accordingly, emit transmitted light from the bundle. The individual strands S are contained within the jacket and fixed therein by means of plastic material.

A spacing ring 108 is placed around the axle hub proximate the end of the fixed ring. A flexible dust and weather shield 110 closes the gap between the fixed ring 94 and rotary ring 114, rotary apertured ring 114, the number of apertures also totalling thirty to correspond with those in the fixed ring and the number of bundles, is provided. These apertures, or openings, are designated 92A for correspondence purposes.

A mounting hub portion 116 of the rotary ring 114 is mounted to the flange 18 of the axel 56 and contains a plurality of second light transmission means consisting of a plurality of fiber optics light guide bundles carried therein by a plastic binder filled interior 120. The secondary guide bundles correspond in number to the guides 104 in the fixed section. The same number of strands S are within the second light transmission guides 118. It will be seen that the inner ends of these strands in the guides terminate severally in openings 92A and are oppositely opposed to the ends 92. It is desired to have the ends of the first and second light transmission strands as directly opposite to one another in operating position as possible. This relationship is shown in FIGS. 3 and 8.

Referring now to FIG. 3, a metallic male member 22 surrounds the light guide proximate the junction of the wheel with the brake drum and this is operatively associated with a female sleeve 124 in the nature of a socket and a clamp is provided at 126. The hub cover 88 is provided with an opening having a rubber grommet 126 therein through which third fiber optic light guide 128 passes and which includes the plural individual fibers corresponding in number to those in the first and second guides. It will be seen in FIG. 6 that this bundle is again separated into individual bundles or groups of the individual strands in numbers equal to those in the previous groups, and these latter, segregated, or separated, bundles terminate in openings 132. The third guide 128 passes through opening 134 in the outer end of the hub cover 88 as shown in FIG. 3.

The terminal ends of the individual bundles, or strands, terminating in these openings 132 serve to emit light rays which are broadly designated at 136 and these light rays can be considered as incident light rays which will impinge upon external surfaces of the chrome or other high finish wheel surfaces and be reflected therefrom as shown at 138. This is the desired end result, i.e. an aesthetically pleasing visual light illumination effect from the reflective surfaces or surface means on the wheel.

The construction and operation of the present invention, primarily utilizing the principles of fiber optics to transmit light from a fixed source on the vehicle body to a rotating member will be obvious. It is understood that the light source can vary, although the closer the light source to the wheel to be illuminated, the greater the efficiency since efficiency of light transmission will decrease the distance covered. While in the present instance the axle shaft and hub are of a particular configuration or construction in an existing vehicle, modifications to accommodate different constructions will be readily apparent.

As hereinbefore mentioned, an opening 142 is located on the lug hole circle and, as shown in FIG. 2, this opening serves as an exit opening 118 for the second optical guide means.

Any and/or all of the operatively intermating openings for the strands can be provided with reflective material therein if desired. As a matter of fact, it has been found that using highly reflective coatings such as chrome on the spherical or truncated conical surfaces 106, as clearly shown in FIG. 8, serves to increase the transmission of light and improve function of the apparatus. The many or multiple plural re-reflected rays will serve to overcome part of light loss existing through transmission losses.

The incorporation of the connection of the second and third light transmission conduit means by the metallic male member 122 and the female sleeve 124, is used to facilitate removal of the cap and wheel from the rotating hub mount or portion.

It is also to be noted that the degree of bend of the individual fiber strands and bundles, in the conduits, or jackets, has been minimized to prevent breakage of the strands.

While a particular mechanical drive system has been shown in the drawings with the principles of the present invention applied thereto, variations necessary for other use situations will be obvious to those skilled in the art.

It is accordingly to be understood that the invention is capable of changes or modifications without departing from the scope of the inventive concept as expressed herein and as defined in the appended claims.

I claim:

1. A vehicle having at least one rotatable wheel, said wheel having light reflective surface means thereon, a light source mounted on said vehicle, light directing means operatively associated with said wheel, a plurality of discrete fiber optic light transmission means operatively associated with said light source adapted to receive light therefrom and transmit the light to said light directing means for said wheel constituting light emitting and ray directing means operable to impinge light on wheel portions having said light reflective surface for illumination and reflection therefrom, the discrete light transmission means consisting of plural separate sets, one set being fixed to said vehicle, another set being operatively attached to said wheel, said sets being disposed at proximate ends thereof in spaced relationship from one another and adapted to transmit light therebetween as said wheel rotates with respect to said vehicle.

2. A vehicle as claimed in claim 1, wherein said vehicle is comprised of a wheeled automobile, the wheels being coated with a highly reflective surface material such as chrome.

3. An automotive vehicle having at least one rotatable wheel, said wheel having light reflective surface means thereon, a light source mounted to said vehicle, first fixed light transmission means operatively associated with said light source adapted to receive light therefrom and transmit the light to a position proximate to, but spaced from, said wheel, separate second light transmission means operatively mounted to and rotatable with said wheel, said first and second light transmission means respectively having coactive light emitting and receiving terminal end means, said light transmission means and their respective emitting and receiving end means consisting of discrete separate sets with said ends disposed in spaced relationship from one another and adapted to transmit light therebetween as said wheel rotates with respect to said vehicle, second light ray emitting terminal end means on said second light transmission means, remote from said first terminal end means thereon, and operable upon rotation of said wheel with respect to said vehicle to direct emitted light rays onto said reflective surface means on said wheel to thereby produce a resultant asethetically pleasing visual light illumination effect from the reflective surface means on the wheel.

4. An automotive vehicle as claimed in claim 3 constituting a wheeled automobile, said light transmission means including fiber optics light guides portions.

5. A vehicle as claimed in claim 4, said automobile including flanged end drive axles, a fixed axle shaft housing on said automobile, said first fixed light transmission means being fixedly attached to said axle housing, said second light transmission means being operatively connected to rotatable wheel mounting means operatively associated with said axle for rotation of said wheels, the spaced relationship of the terminal ends of said discrete separate sets permitting relative displacement of said terminal ends while permitting light transmission between the terminal ends of said respective sets.

6. A vehicle as claimed in claim 5, including a fixed ring operatively attached to said axle housing, said fixed ring having a plurality of bores therethrough, said first fixed light transmission means consisting of a jacketed bundle of separate fiber optic glass strands, said jacket being affixed to said fixed ring, the strands within said jacket being divided into a plurality of separate bundles, each bundle including a plurality of separate strands and each separate bundle passing into and through the openings in said fixed ring with the terminal ends of each separated strand bundle being openly exposed through an end face of said fixed ring, said ends constituting said light emitting terminal end means for said first light transmission means.

7. A vehicle as claimed in claim 6, said rotatable means for mounting said wheel including a rotatable ring of construction similar to said fixed ring in which said first fixed light transmission means terminates, said second light transmission means being similar to the aforesaid said first transmission means and having similar terminal ends in facing and spaced relationship from the terminal ends of said first light transmission, said terminal ends, upon rotation of said rotatable member and said wheel mounted thereto serving to transmit light from said light source and emit light rays on said reflective surfaces of said wheel.

8. A vehicle as claimed in claim 7, the facing openings in said fixed and rotating rings being configured generally in truncated conical shape and adapted for re-reflection of light rays transmitted through said light transmission means.

9. A vehicle as claimed in claim 7, the jacketed conduit of said second light transmission means terminating in a metallic male end member, a female sleeve operatively affixed to said wheel and having said male end member removably insertable therein, a third light transmission means similar in construction to said first and second light transmission means being attached to said rotatable member and having one end thereof coactively disposed within said female sleeve in light transmissive coactive positionment with the fiber optical strands in said second light transmission means terminating in said metal male member to permit passage of light between the mated coactive strands of said second and third light transmission means, the free end of said third light transmission means being constituted by a plurality of separated bundles of said fiber optic strands, said bundles having their free terminal ends directed toward said wheel for impingement of light rays on said reflective surfaces thereof.

10. A vehicle as claimed in claim 9, a hub cone and spacer member being operatively attached to said rotatable member for mounting of said wheel, a wheel cap of light reflective material attached to said cone and having a plurality of passages formed therein commensurate with the number of said separate strand bundles with the strand bundles passing therethrough and terminating at a surface thereof for independent transmission of light from each said bundle toward said wheel as said wheel rotates.

* * * * *